(12) United States Patent
Wuidart

(10) Patent No.: US 8,907,761 B2
(45) Date of Patent: Dec. 9, 2014

(54) AUTHENTICATION OF AN ELECTROMAGNETIC TERMINAL-TRANSPONDER COUPLE BY THE TERMINAL

(75) Inventor: Luc Wuidart, Pourrieres (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 929 days.

(21) Appl. No.: 12/815,824

(22) Filed: Jun. 15, 2010

(65) Prior Publication Data

US 2010/0328027 A1 Dec. 30, 2010

(30) Foreign Application Priority Data

Jun. 25, 2009 (FR) ...................................... 09 54351

(51) Int. Cl.
*G05B 19/00* (2006.01)
*H04Q 5/22* (2006.01)
*G06K 7/00* (2006.01)
*G06K 19/073* (2006.01)
*G06K 19/07* (2006.01)

(52) U.S. Cl.
CPC ........ *G06K 7/0008* (2013.01); *G06K 19/07336* (2013.01); *G06K 19/0723* (2013.01)
USPC ...................... 340/5.61; 340/10.31

(58) Field of Classification Search
USPC .................... 340/5.8, 10.1, 10.4, 524, 539.22
See application file for complete search history.

(56) References Cited

U.S. PATENT DOCUMENTS

| | | | | |
|---|---|---|---|---|
| 5,491,715 A * | 2/1996 | Flaxl | ............................... | 375/344 |
| 5,703,573 A | 12/1997 | Fujimoto et al. | | |
| 6,323,566 B1 * | 11/2001 | Meier | ........................... | 307/10.2 |
| 6,473,028 B1 * | 10/2002 | Luc | ................ | 342/118 |
| 6,650,227 B1 * | 11/2003 | Bradin | ......................... | 340/10.3 |
| 6,650,229 B1 | 11/2003 | Wuidart et al. | | |
| 6,703,921 B1 * | 3/2004 | Wuidart et al. | .............. | 340/10.4 |
| 7,046,121 B2 | 5/2006 | Wuidart | | |
| 7,049,935 B1 | 5/2006 | Wuidart et al. | | |
| 7,049,936 B2 * | 5/2006 | Wuidart | ........................ | 340/10.4 |
| 7,469,127 B2 * | 12/2008 | Takiguchi | .................... | 455/41.1 |

(Continued)

FOREIGN PATENT DOCUMENTS

| | | |
|---|---|---|
| CN | 101303745 | 11/2008 |
| EP | 1071038 A1 | 1/2001 |
| FR | 2757952 A1 | 7/1998 |

OTHER PUBLICATIONS

French Search Report dated Feb. 17, 2010 from corresponding French Application No. 09/54351.
French Search Report dated Feb. 9, 2010 from related French Application No. 09/54147.

(Continued)

*Primary Examiner* — Hai Phan
*Assistant Examiner* — Royit Yu
(74) *Attorney, Agent, or Firm* — Seed IP Law Group PLLC

(57) ABSTRACT

A method of authentication, by a terminal generating a magnetic field, of a transponder located in this field, wherein: first data, relative to the current in an oscillating circuit of the terminal, measured by the terminal for a first value of the resistive load of the transponder, are transmitted to the transponder; second corresponding data are evaluated by the transponder for a second value of the resistive load and are transmitted to the terminal; and said second data are compared with third corresponding data, measured by the terminal for the second value of the resistive load.

20 Claims, 4 Drawing Sheets

(56) References Cited

U.S. PATENT DOCUMENTS

| | | | |
|---|---|---|---|
| 7,536,152 B2* | 5/2009 | Inano et al. | 455/41.2 |
| 8,446,259 B2* | 5/2013 | Wuidart | 340/10.4 |
| 2001/0015697 A1* | 8/2001 | Wuidart | 340/825.49 |
| 2002/0011922 A1 | 1/2002 | Wuidart | |
| 2003/0071717 A1 | 4/2003 | Hagl et al. | |
| 2004/0066278 A1* | 4/2004 | Hughes et al. | 340/10.1 |
| 2005/0001609 A1 | 1/2005 | Cuylen | |
| 2005/0231328 A1 | 10/2005 | Castle et al. | |
| 2008/0136643 A1 | 6/2008 | Yeo et al. | |
| 2008/0204206 A1* | 8/2008 | Frohler | 340/426.1 |
| 2008/0211621 A1* | 9/2008 | Nowottnick et al. | 340/5.2 |

OTHER PUBLICATIONS

French Search Report dated Feb. 3, 2010 from related French Application No. 09/54347.
French Search Report dated Feb. 9, 2010 from related French Application No. 09/54148.
French Search Report dated Feb. 8, 2010 from related French Application No. 09/54149.
French Search Report dated Feb. 2, 2010 from related French Application No. 09/54345.
Chinese office action dated Feb. 25, 2014 from corresponding Chinese Application No. CN201010212712.1 filed Jun. 24, 2010.

* cited by examiner

AUTHENTICATION OF AN ELECTROMAGNETIC TERMINAL-TRANSPONDER COUPLE BY THE TERMINAL

CROSS REFERENCE TO RELATED APPLICATIONS

This application claims the priority benefit of French patent application Ser. No. 09/54351, filed on Jun. 25, 2009, entitled "AUTHENTICATION OF AN ELECTROMAGNETIC TERMINAL-TRANSPONDER COUPLE BY THE TERMINAL," which is hereby incorporated by reference to the maximum extent allowable by law.

BACKGROUND OF THE INVENTION

1. Field of the Invention

The present invention generally relates to electronic systems, and more specifically to systems using electromagnetic transponders, that is, transceivers capable of being interrogated in a contactless and wireless manner by a read and/or write terminal.

2. Discussion of the Related Art

Many communication systems are based on a modulation of an electromagnetic field generated by a terminal. They range from the simplest electronic tag used as a theft-prevention device to more complex systems where a transponder intended to communicate with the terminal when it is in its field, is equipped with calculation functions (electronic purse, for example) or data processing functions.

Electromagnetic transponder systems are based on the use of oscillating circuits comprising a winding forming an antenna, on the transponder side and on the terminal side. Such circuits are intended to be coupled by a near magnetic field when the transponder enters the field of the terminal. The oscillating circuits of the terminal and of the transponder are generally tuned to the same frequency corresponding to the excitation frequency of the oscillating circuit of the terminal.

In most cases, transponders have no autonomous power supply and extract the power supply necessary to their circuits from the high-frequency field radiated by the antenna of the terminal.

When a transponder needs to communicate with a terminal, the transponder may have to authenticate the terminal before accepting a data exchange. For example, in applications where the transponder is used as a payment means (be it in money or units of account), it may reserve payments to certain terminals. According to another example, a transponder of chip card type, associated with electronic equipment (for example, a personal digital assistant or a cell phone) identifies or authenticates a user in a communication with other electronic equipment (for example, a laptop or desktop computer).

Symmetrically, the terminal may have to authenticate the transponder before transmitting certain data thereto.

Currently, authentication processes use cryptography algorithms and a data exchange between the terminal and the transponder. Such processes require significant power- and time-intensive calculations. Further, any cryptographic process is more or less sensitive to attacks aiming at discovering the secret of the authentication to hack the system.

SUMMARY OF THE INVENTION

It would be desirable for a transponder to be able to authenticate a terminal with which it needs to communicate before it has to transmit data to the terminal, and for the terminal to also be able to authenticate the transponder.

It would also be desirable to have an authentication process independent from any cryptography.

It would also be desirable to have a fast, less power- and calculation-intensive authentication process.

To achieve all or part of these objects as well as others, at least one embodiment of the present invention provides a method of authentication, by a terminal generating a magnetic field, of a transponder located in this field, wherein:

first data, relative to the current in an oscillating circuit of the terminal, measured by the terminal for a first value of the resistive load of the transponder, are transmitted to the transponder;

second corresponding data are evaluated by the transponder for a second value of the resistive load and is transmitted to the terminal; and said second data are compared with third corresponding data, measured by the terminal for the second value of the resistive load.

According to an embodiment of the present invention, the transponder evaluates said second data based on said first data and on fourth data relative to the level of a D.C. voltage generated by an oscillating circuit of the transponder, respectively measured for said first value of the resistive load and for a second resistive load value.

According to an embodiment of the present invention, said data are ratios of the current in the oscillating circuit of the terminal while no transponder is located in its field and of this same current with the values of the resistive load.

According to an embodiment of the present invention, in the absence of an authentication, the terminal sends intentionally incorrect data.

The present invention also provides a method for authenticating a terminal generating a magnetic field and a transponder which is present in its field, wherein:

the transponder is authenticated by the terminal; and to authenticate the terminal, the transponder exploits said first and fourth data.

According to an embodiment of the present invention, the transponder:

evaluates, based on said first and fourth data, a ratio between values of the current in the oscillating circuit of the terminal; and compares this ratio with said first data.

According to an embodiment of the present invention, the transponder:

evaluates, based on said first and fourth data, a value of said voltage; and compares this evaluated value with the measured value.

According to an embodiment of the present invention, in the absence of an authentication by the transponder, said transponder sends intentionally incorrect data.

At least one embodiment of the present invention also provides an electromagnetic transponder comprising:

an oscillating circuit upstream of a rectifying circuit capable of providing a D.C. voltage when the transponder is in the magnetic field of a terminal; and at least one processing unit capable of implementing the authentication method.

At least one embodiment of the present invention also provides a terminal capable of generating an electromagnetic field for a transponder, comprising means capable of implementing the authentication method.

The foregoing objects, features, and advantages of the present invention will be discussed in detail in the following non-limiting description of specific embodiments in connection with the accompanying drawings.

DETAILED DESCRIPTION

Figure 1:
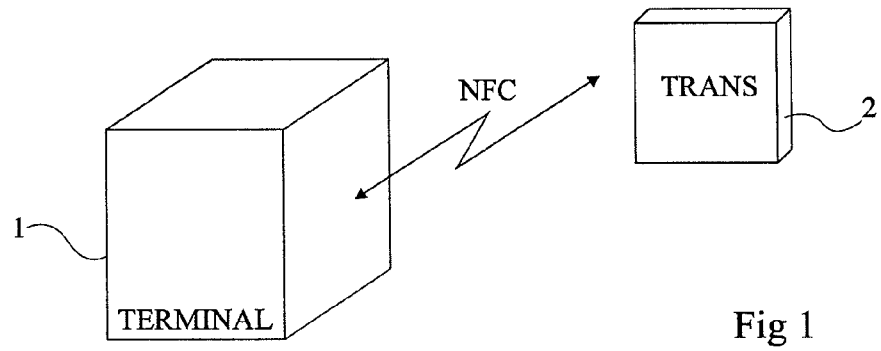
FIG. 1 is a very simplified representation of a transponder system of the type to which the present invention applies as an example.

The same elements have been designated with the same reference numerals in the different drawings. For clarity, only those steps and elements which are useful to the understanding of the present invention have been shown and will be described. In particular, the coding and the modulation of the communications between the transponder and the terminal have not been detailed, the present invention being compatible with any usual communication. Further, the functions that can be implemented by a terminal or by a transponder, other than the authentication by this transponder have not been detailed either, the present invention being here again compatible with any usual function of a terminal or of a transponder.

FIG. 1 is a block diagram of an electromagnetic transponder communication system. A terminal 1 (TERMINAL) can communicate in near field (for example according to a near field communication protocol NFC) with a distant element, that is, a transponder (TRANS).

The terminal may take different forms, for example, a transport ticket validation terminal, an electronic passport reader, a laptop computer, a mobile telecommunication device (GSM phone, PDA, etc.), an electronic control unit for starting an automobile vehicle, etc.

The transponder may similarly take different forms, for example, a chip card, an electronic transport ticket, an electronic passport, a telecommunication terminal (GSM phone, PDA, etc.), an electronic tag, etc.

Figure 2:
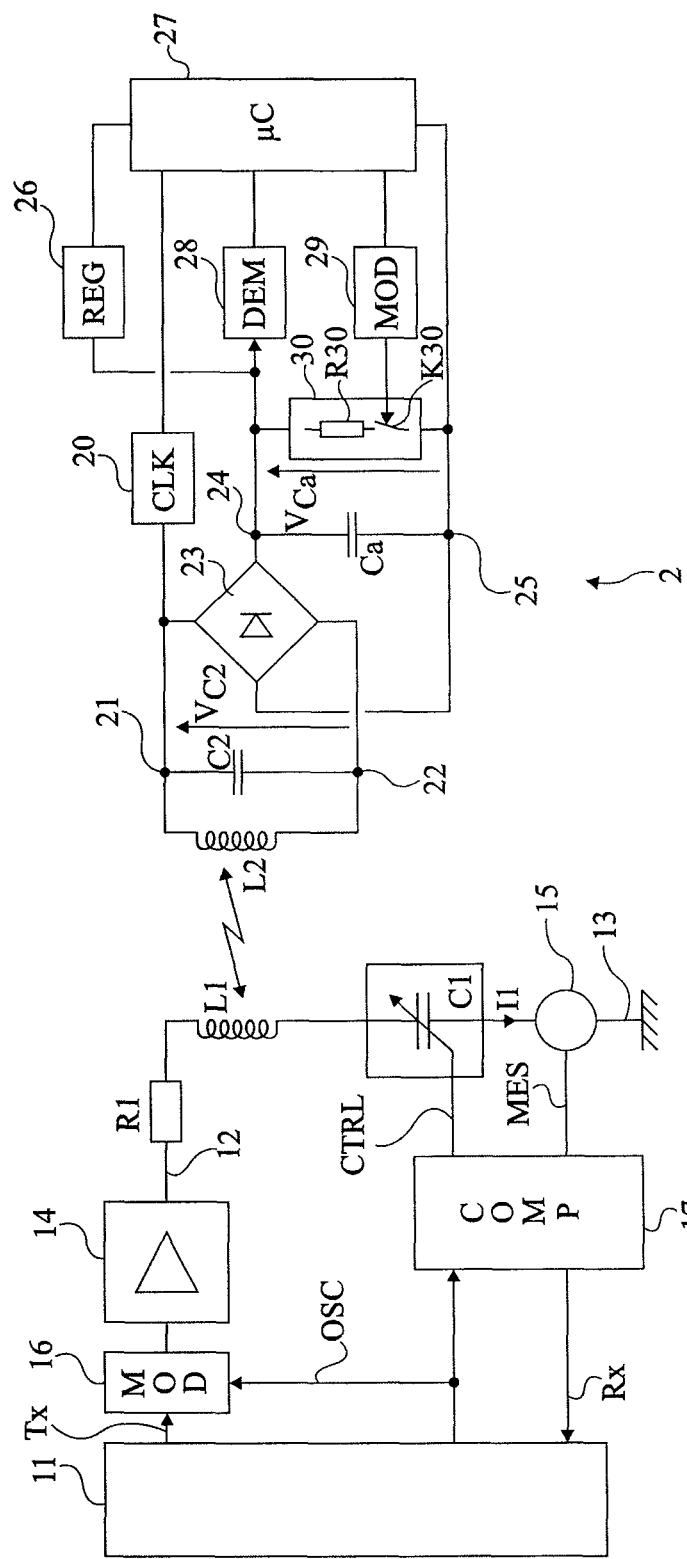
FIG. 2 is a simplified block diagram of a terminal and of a transponder of an electromagnetic transponder communication system.

FIG. 2 very schematically shows a simplified example of a terminal 1 and of a transponder 2.

Terminal 1 comprises an oscillating circuit, generally series, formed of an inductance L1 in series with a capacitor C1 and a resistor R1. This series oscillating circuit is, in the example of FIG. 2, connected between an output terminal 12 of an amplifier or antenna coupler 14 and a terminal 13 at a reference voltage (generally the ground). An element 15 for measuring the current in the oscillating circuit is interposed, for example, between capacitive element C1 and ground 13. Measurement element 15 belongs to a phase regulation loop which will be described hereafter. Amplifier 14 receives a high-frequency transmission signal originating from a modulator 16 (MOD) which receives a reference frequency (signal OSC), for example, from a quartz oscillator (not shown). Modulator 16 receives, if need be, a signal Tx originating from a circuit 11 for controlling and exploiting the transmissions. Circuit 11 is generally provided with a control and data processing microprocessor, communicating with different input/output circuits (keyboard, display, element of exchange with a server, etc.) and/or processing circuits, not shown. The elements of terminal 1 most often draw the power necessary to their operation from a supply circuit (not shown) connected, for example, to the power line distribution system (mains) or to a battery (for example, that of an automobile vehicle or of a portable telephone or computer). Modulator 16 provides a high-frequency carrier (for example, at 13.56 MHz) to series oscillating circuit L1-C1 which generates a magnetic field.

Capacitive element C1 is, for example, a variable-capacitance element controllable by a signal CTRL. This element takes part in the phase regulation of current I1 in antenna L1 with respect to a reference signal. This regulation is a regulation of the high-frequency signal, that is, of the signal of the carrier corresponding to the signal provided to amplifier 14 in the absence of data Tx to be transmitted. The regulation is performed by varying capacitance C1 of the oscillating circuit of the terminal to maintain the current in the antenna in constant phase relationship with a reference signal. This reference signal for example corresponds to signal OSC provided to modulator 14. Signal CTRL originates from a circuit 17 (COMP) having the function of detecting the phase interval with respect to the reference signal and of accordingly modifying the capacitance of element C1. The comparator receives data MES about current I1 in the oscillating circuit detected by measurement element 15 (for example, an intensity transformer or a resistor).

A transponder 2, capable of cooperating with terminal 1, comprises an oscillating circuit, for example, parallel, formed of an inductance L2 in parallel with a capacitor C2 between two terminals 21 and 22. The parallel oscillating circuit (called receive mode resonant circuit) is intended to capture the magnetic field generated by oscillating circuit L1-C1 of terminal 1. Circuits L2-C2 and L1-C1 are tuned to a same resonance frequency (for example, 13.56 MHz). Terminals 21 and 22 are connected to two A.C. input terminals of a rectifying bridge 23 (most often, fullwave). The rectified output terminals of bridge 23 respectively define a positive terminal 24 and a reference terminal 25. A capacitor Ca is connected between terminals 24 and 25 to smooth the rectified voltage. The recovered power is used to recharge a battery, not shown.

When transponder 2 is in the field of terminal 1, a high-frequency voltage is generated across resonant circuit L2-C2. This voltage, rectified by bridge 23 and smoothed by capacitor Ca, provides a supply voltage to electronic circuits of the transponder via a voltage regulator 26 (REG). Such circuits generally comprise a processing unit 27 (for example, a microcontroller μC) associated with a memory (not shown), a demodulator 28 (DEM) of the signals that may have been received from terminal 1, and a modulator 29 (MOD) for transmitting data to the terminal. The transponder is generally synchronized by means of a clock (CLK) extracted, by a block 20, from the high-frequency signal recovered, before rectification, from one of terminals 21 and 22. Most often, all the electronic circuits of transponder 2 are integrated in a same chip.

To transmit data from terminal 1 to the transponder, circuit 16 modulates (generally in amplitude) the carrier (signal OSC) according to signal Tx. On the side of transponder 2, these data are demodulated by demodulator 28 based on voltage $V_{Ca}$. The demodulator may sample the signal to be demodulated upstream of the rectifying bridge.

To transmit data from transponder 2 to terminal 1, modulator 29 controls a stage 30 of modulation (retromodulation) of the load formed by the transponder circuits on the magnetic field generated by the terminal. This stage is generally formed of an electronic switch K30 (for example, a transistor) and of a resistor R30 (or a capacitor), in series between terminals 24 and 25. Switch K30 is controlled at a so-called sub-carrier frequency (for example, 847.5 kHz), much lower (generally with a ratio of at least 10) than the frequency of the excitation signal of the oscillating circuit of terminal 1. When switch K30 is on, the oscillating circuit of the transponder is submitted to an additional damping with respect to the load formed by circuits 20, 26, 27, 28, and 29 so that the transponder samples a greater amount of power from the high-frequency magnetic field. On the side of terminal 1, amplifier 14 maintains the amplitude of the high-frequency excitation signal constant. Accordingly, the power variation of the transponder translates as an amplitude and phase variation of the current in antenna L1. This variation is detected by an amplitude or phase demodulator of the terminal. In the embodiment illustrated in FIG. 2, comparator 17 integrates a phase demodulator also used to demodulate the signal originating from the transponder. Accordingly, comparator 17 provides a signal Rx giving back to circuit 11 a possible retromodulation of data received from a transponder. Other demodulation circuits may be provided, for example, a circuit exploiting a measurement of the voltage across capacitor C1.

Many variations exist to encode/decode and modulate/demodulate communications between a transponder and a terminal.

The response time of the phase regulation loop is sufficiently long to avoid disturbing the possible retromodulation from a transponder and sufficiently short as compared with the speed at which a transponder passes in the field of the terminal. One can speak of a static regulation with respect to the modulation frequencies (for example, the 13.56-MHz frequency of the remote supply carrier and the 847.5-kHz retromodulation frequency used to transmit data from the transponder to the terminal).

An example of a phase regulation terminal is described in document EP-A-0857981.

Regulating the phase on the terminal side enables using current and voltage measurements in the oscillating circuit of the transponder to deduce from these measurements information relative to the transponder coupling when it is in the field of the terminal. The coupling coefficient between the oscillating circuit of the terminal and of the transponder essentially depends on the distance separating the transponder from the terminal. The coupling coefficient, noted k, is always between 0 and 1. It can be defined by the following formula:

$$k = \frac{M}{\sqrt{L1 \cdot L2}}, \quad \text{(formula 1)}$$

where M represents the mutual inductance between inductances L1 and L2 of the oscillating circuits of the terminal and of the transponder.

An optimum coupling is defined as being the position at which voltage $V_{C2}$ across the oscillating circuit of the transponder is maximum. This optimum coupling, noted $k_{opt}$, may be expressed as:

$$k_{opt} = \sqrt{\frac{L2}{L1} \cdot \frac{R1}{R2}}, \quad \text{(formula 2)}$$

where R2 represents the resistance equivalent to the load formed by the elements of the transponder on its own oscillating circuit. In other words, resistance R2 represents the equivalent resistance of all the circuits of transponder 2, placed in parallel on capacitor C2 and inductance L2 (before or after the rectifying bridge). The conductance due to the transponder circuits will be called "resistive load". The level of this load is symbolized by resistor R2 in parallel across the oscillating circuit. In above formula 2, the series resistance of inductance L1 (terminal antenna) has been neglected. It can also be considered that the value of this series resistance is, for simplification, included in the value of resistor R1.

Formula 2 represents a signature of the terminal-transponder couple. For the same transponder and given operating conditions (load R2), the optimum coupling coefficient varies according to the terminal which conditions values L1 and R1.

It is provided to take advantage of this feature to enable a transponder to authenticate the terminal in the range of which it is located by indirectly verifying this signature and, similarly, to enable the terminal to authenticate the transponder.

To authenticate the terminal-transponder couple, the value of voltage $V_{C2}$ across capacitive element C2 of its oscillating circuit is exploited. This voltage is provided by the following relation:

$$V_{C2} = \frac{I2}{\omega \cdot C_2}, \quad \text{(formula 3)}$$

where I2 represents the current in the oscillating circuit of the transponder, and where ω represents the pulse of the signal.

Current I2 is equal to:

$$I2 = \frac{M \cdot \omega \cdot I1}{Z2}, \quad \text{(formula 4)}$$

where I1 represents the current in the oscillating circuit of the terminal and where Z2 represents the transponder impedance.

Impedance Z2 of the transponder is provided by the following relation:

$$Z2^2 = X2^2 + \left(\frac{L2}{R2 \cdot C2}\right)^2, \quad \text{(formula 5)}$$

where X2 represents the imaginary part of the impedance of the oscillating circuit $$\left(X2 = \omega \cdot L2 - \frac{1}{\omega \cdot C2}\right)$$

and where R2 represents the resistance equivalent to the load formed by the transponder elements on its own oscillating circuit. In other words, resistance R2 represents the equivalent resistance of all the circuits (microprocessors, retromodulation means, etc.) of transponder 2, brought in parallel on capacitor C2 and inductance L2 (before or after the rectifying bridge). The conductance due to the transponder circuits, and thus their consumption, will be called "resistive load". The level of this load is symbolized by resistor R2 in parallel across the oscillating circuit.

Further, current I1 in the oscillating circuit of the terminal is given by the following relation:

$$I1 = \frac{Vg}{Z1_{app}}, \quad \text{(formula 6)}$$

where Vg designates a so-called generator voltage, exciting the oscillating circuit of the terminal, and where $Z1_{app}$ represents the apparent impedance of the oscillating circuit.

Regulating the phase of the oscillating circuit of the terminal enables all the variations which would tend to modify, statically with respect to the modulation frequencies, the imaginary part of the load formed by the transponder, to be compensated by the phase regulation loop. It is thus ensured that in static operation, the imaginary part of impedance $Z1_{app}$ is zero. Accordingly, impedance $Z1_{app}$ becomes equal to apparent resistance $R1_{app}$ (real part of the impedance) and may be expressed as:

$$Z1_{app} = R1_{app} = R1 + \frac{k^2 \cdot \omega^2 \cdot L1 \cdot L2^2}{Z2^2 \cdot R2 \cdot C2}. \quad \text{(formula 7)}$$

In above formula 7, the series resistance of inductance L1 (terminal of the antenna) has been neglected. It can also be considered that the value of this series resistance is, for simplification, included in the value of resistance R1.

Since the oscillating circuits are tuned, it can be considered that imaginary part X2 of impedance Z2 is, as a first approximation, close to zero. As a result, the value of impedance Z2 can be written as:

$$Z2 = \frac{L2}{R2 \cdot C2}. \quad \text{(formula 8)}$$

By inserting this simplification into formulas 4 and 7, and inserting formula 4 into formula 3, the following formula can be obtained for voltage $V_{C2}$ recovered across the oscillating circuit of the transponder:

$$V_{C2} = k \cdot \sqrt{\frac{L1}{L2}} \cdot \frac{Vg}{\frac{R1}{R2} + k^2 \cdot \frac{L1}{L2}}. \quad \text{(formula 9)}$$

Formula 9 shows that, for a given terminal (fixed values of Vg, R1, and L1) and for a fixed impedance L2 (and thus a fixed value of C2), voltage $V_{C2}$ only depends on coupling k and on the resistive load (equivalent to resistor R2) formed by the transponder circuits and brought in parallel on the oscillating circuit.

It should be noted that formula 9 can only be applied when the oscillating circuit of transponder L2-C2 is considered to be set to the tuning frequency, that is, $\omega \cdot \sqrt{L2 \cdot C2} = 1$.

For a given coupling value k, considering that the impedance of the oscillating circuit of the terminal does not vary and that the circuits remain tuned, the ratio between values $V_{C2]R21}$ and $V_{C2]R20}$ of voltage $V_{C2}$, respectively for values R21 and R20 of resistor R2, provides, according to formula 2 and 9, the following relation:

$$\frac{V_{C2]R21}}{V_{C2]R20}} = \frac{\left(\frac{k}{k_{opt]R20}}\right)^2 + 1}{\left(\frac{k}{k_{opt]R20}}\right)^2 + \frac{R20}{R21}}. \quad \text{(formula 10)}$$

Formula 10 shows that by increasing the value of resistor R2 from a first value R20 to a second greater value R21 (which amounts to decreasing the load of the transponder circuits on oscillating circuit L2-C2), voltage $V_{C2]R21}$ will be greater than voltage $V_{C2]R20}$. Conversely, a decrease in the value of transistor R2 causes a decrease in recovered voltage $V_{C2}$.

Another characteristic operating condition of the terminal-transponder couple is linked to an off-load operation of the terminal.

Formulas 6 and 7 enable to write:

$$I1 = \frac{Vg}{R1 + k^2 \cdot \frac{L1}{L2} \cdot R2}. \quad \text{(formula 11)}$$

The off-load values represent the current and the voltage on the terminal side when no transponder is present in the field of the terminal. In this off-load operation, the apparent impedance of the oscillating circuit of the terminal now only depends on its components R1, C1, and L1. Further, due to the phase regulation, the imaginary part of this impedance is always zero. Formula 11 becomes:

$$I1_{off-load} = \frac{Vg}{R1}. \quad \text{(formula 12)}$$

Formulas 11 and 12 enable to write that, for a same current coupling k:

$$k^2 = \frac{R1}{R2} \cdot \frac{L2}{L1} \cdot \left(\frac{I1_{off-load}}{I1} - 1\right). \quad \text{(formula 13)}$$

The combination of formulas 12 and 13 provides:

$$\left(\frac{k}{k_{opt}}\right)^2 = \frac{I1_{off-load}}{I1} - 1. \quad \text{(formula 14)}$$

The current ratios thus provide information about the optimum coupling coefficient, and thus about the system signature for a given load.

Further, when a transponder is present in the field of the terminal with a given resistive load (for example, equivalent to a resistor R2 of value R20), the terminal can measure the value of current $I1_{]R20}$ in its oscillating circuit L1-C1.

When the ratio of the recovered voltages with two values R20 and R21 of resistor R2 is expressed, for a given coupling k, and combining formulas 10 and 14, the following relation is obtained:

$$\frac{V_{C2]R21}}{V_{C2]R20}} = \frac{\frac{I1_{off-load}}{I1_{]R20}}}{\frac{R20}{R21} + \left(\frac{I_{off-load}}{I1_{]R20}} - 1\right)}. \quad \text{(formula 15)}$$

This relation may also be written, for R20<R21, as:

$$\frac{I1_{off-load}}{I1_{]R20}} = \frac{1 - \frac{R20}{R21}}{1 - \frac{V_{C2]R20}}{V_{C2]R21}}}, \quad \text{(formula 16)}$$

or, for R20>R21, as:

$$\frac{I1_{off-load}}{I1_{|R20}} = \frac{\frac{R20}{R21} - 1}{\frac{V_{C2|R20}}{V_{C2|R21}} - 1}. \quad \text{(formula 16')}$$

When ratio R21/R20 is expressed based on formula 16, the following relation is obtained:

$$\frac{R20}{R21} = \frac{\frac{I1_{off-load}}{I1_{|R21}} - 1}{\frac{I1_{off-load}}{I1_{|R20}} - 1}, \quad \text{(formula 17)}$$

whether value R20 is smaller or greater than value R21. Relation 17 may also be expressed as:

$$\frac{I1_{off-load}}{I1_{|R21}} = \frac{R21}{R20} \cdot \left(\frac{I1_{off-load}}{I1_{|R20}} - 1\right) + 1. \quad \text{(formula 18)}$$

It is provided to use these ratios between off-load currents and under a given resistive load (equivalent to a resistor R2 of value R20 or R21) to have the terminal authenticate the transponder and to have the transponder authenticate the terminal.

Figure 3:
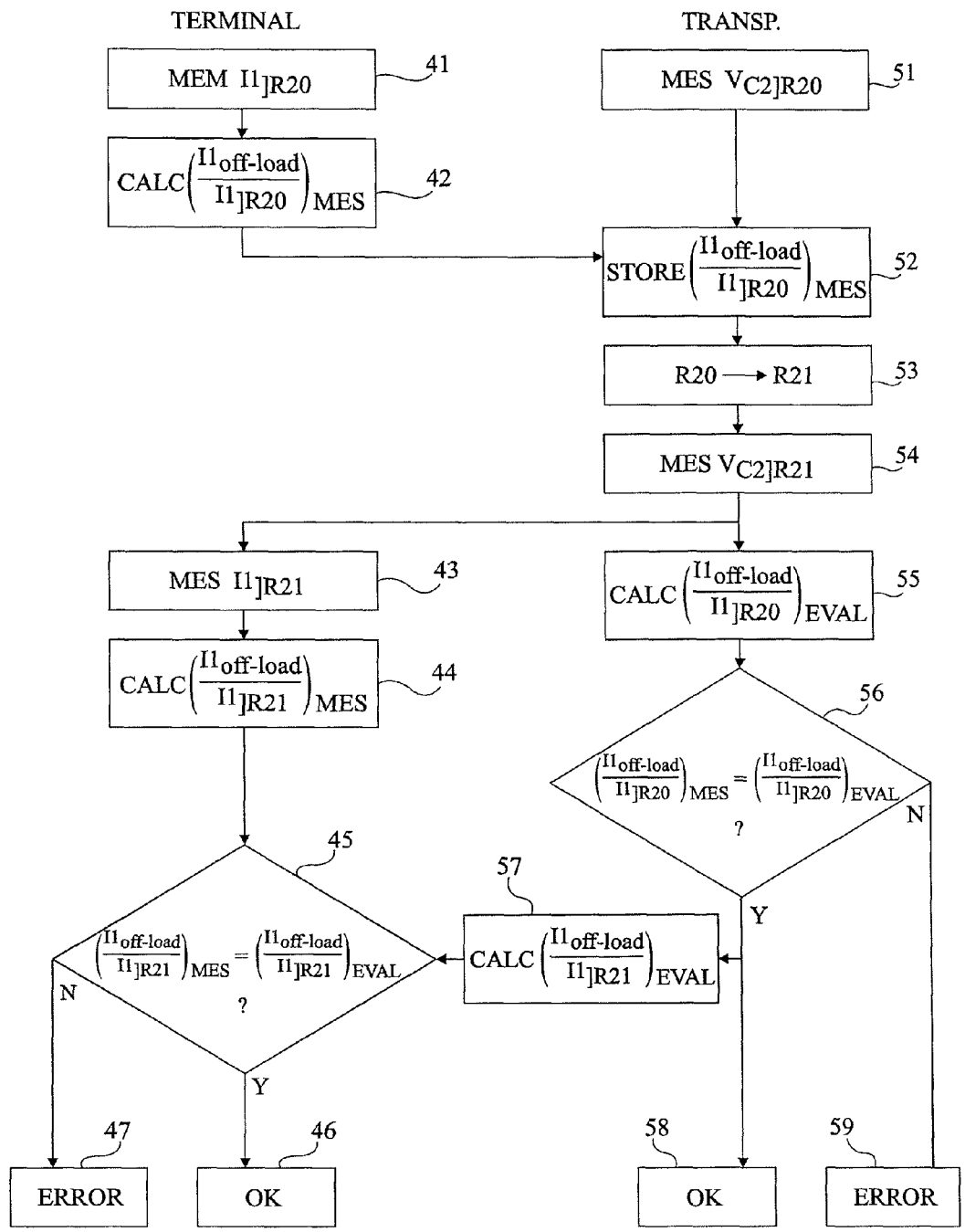
FIG. 3 is a functional block diagram illustrating an embodiment of the method of authentication of a terminal by a transponder.

FIG. 3 is a functional block diagram of an embodiment of a procedure of mutual authentication of a terminal and of a transponder.

The off-load current in the oscillating circuit of the terminal is assumed to have been previously stored and recorded. Preferably, this off-load current determination is performed while the terminal is in its functional environment to take into account possible static disturbances influencing the measurement. According to a preferred variation, the value of the off-load current is periodically updated (for example, it is programmed to be measured in off-load periods of the system when it is known that no transponder is present).

When the terminal detects a transponder in the field, it measures (block 41, MES $I1_{|R20}$) current I1 in its oscillating circuit (for example, by means of element 15), then calculates (block 42, CALC ($I1_{off-load}/I1_{|R20})_{MES}$) the ratio between the measured value and the off-load current. The result is transmitted to the transponder, which stores it (block 52, STORE ($I1_{off-load}/I1_{|R20})_{MES}$).

The transponder measures and stores (block 51, MES $V_{C2|R20}$), before or after having received the information relative to the current from the terminal, voltage $V_{C2}$ across capacitor C2 with a first value R20 of resistor R2.

Then (block 53, R20→R21), it modifies its resistive load so that equivalent resistor R2 takes a value R21. Value R21 is for example selected to be greater than value R20. The transponder then measures (block 54, MES $V_{C2|R21}$) voltage $V_{C2}$ with this value R21 and stores the result.

The transponder then calculates (block 55, CALC ($I1_{off-load}/I1_{|R20})_{EVAL}$) an expected value of the ratio between the values of currents I1 of the off-load terminal and of the terminal with resistor R20, and compares (block 56, ($I1_{off-load}/I1_{|R20})_{MES}=(I1_{off-load}/I1_{|R20})_{EVAL}$?) the evaluated value with the measured value received from the terminal.

In case of a divergence (output N of block 56), this means that the oscillating circuit of the terminal does not respect the signature.

If test 56 confirms identical values, the transponder considers the terminal as authentic (block 58, OK). Otherwise (output N of block 56), it starts an error processing (block 59, ERROR). This processing for example corresponds to a transaction denial, to a transponder reset, to a fail-soft operation (without performing the functions which are critical as to the manipulated information), etc. It may also be provided for the transponder to send messages to mislead or confuse the terminal with intentionally incorrect information, for example, messages comprising random data. Various other processings may be envisaged, for example, any error processing usually provided in the absence of an authentication by a ciphering mechanism.

If the terminal is considered as authentic, the transponder calculates and transmits to the terminal (block 57, CALC ($I1_{off-load}/I1_{|R21})_{EVAL}$) an evaluated value of the ratio between currents I1, in the off-load state and with value R21.

Simultaneously (at any time after step 53), the transponder notifies the terminal that it has switched its resistive load to another value to cause a new measurement of current I1.

The terminal (block 43, MES $I1_{|R21}$) measures current I1, then calculates (block 44, CALC ($I1_{off-load}/I2_{|R21})_{MES}$) the ratio of off-load current I1 to current $I1_{|R21}$ and stores the result.

The terminal then verifies (block 45, ($I1_{off-load}/I1_{off-load}/I1_{|R21})_{MES}=(I1_{off-load}/I1_{|R21})_{EVAL}$?) the value that it has measured against the value evaluated by the transponder. In case of an identity (output Y of block 45), the terminal considers the transponder as authentic (block 46, OK). Otherwise, it starts an error processing (block 47, ERROR). Like for the transponder, different error processings may be envisaged according to the application (for example, a blocking, the sending of intentionally incorrect information, etc.).

Figure 4:
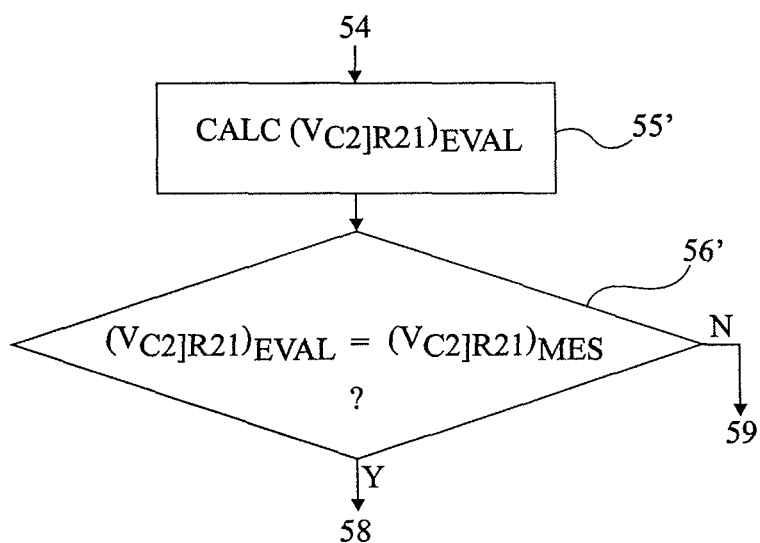
FIG. 4 illustrates a variation of the embodiment of FIG. 3.

FIG. 4 partially illustrates a variation of FIG. 3 in which calculation 55 and test 56 are replaced with an evaluation (block 55', CALC ($V_{C2|R21})_{EVAL}$) of voltage $V_{C2}$ with value R21 of resistor R2, and a comparison (block 56', ($V_{C2|R21})_{EVAL}=(V_{C2|R21})_{MES}$?) of this evaluated value with respect to the value measured at step 54. The rest is identical to the embodiment of FIG. 3. The variation of FIG. 4 may be combined with the embodiment of FIG. 3.

Accordingly, for a given terminal (fixed values of Vg and R1) and a system in the tuned state, the transponder-terminal couple can be authenticated by exploitation of the voltages obtained on the transponder side with two resistive loads (equivalent to resistors R20 and R21) and of the corresponding currents in the oscillating circuit of the terminal.

In practice, voltage $V_{C2}$ is not directly measured across the oscillating circuit of the transponder, but the smoothed voltage across voltage $V_{Ca}$ at the output of rectifying bridge 23. Voltage $V_{Ca}$ is proportional to voltage $V_{C2}$. Since voltage ratios are evaluated, it is not necessary to know the proportionality factor between voltages $V_{C2}$ and $V_{Ca}$. In a specific embodiment, the measurement is performed by the microprocessor. The storage of the values of the measured voltages is performed either in analog fashion or, preferentially in digital fashion over several bits, the number of which depends on the desired analysis accuracy.

The tests may be performed in an order different from that indicated hereabove. However, they are preferentially performed in an order of increasing calculation complexity, which enables to more rapidly reject a terminal which is not adapted to the transponder.

Further, different intermediary values may be stored to be reused in the successive tests or, conversely, calculated on the fly.

A minimum value may be taken into account to decrease the value of resistor R2, this value corresponding to the minimum acceptable value to preserve a sufficient supply voltage for the transponder circuits. This value is obtained by considering ratio R20/R2min according to formula 16'. Noting $V_{C2min}$ the voltage with resistance R2min, this formula becomes:

$$\frac{I1_{off-load}}{I1_{|R20}} = \frac{\frac{R20}{R2min} - 1}{\frac{V_{C2|R20}}{V_{C2min}} - 1}. \quad \text{(formula 19)}$$

Tolerances or acceptable ranges of values may be introduced into the tests to take into account possible operating drifts of the terminal or, in the case of a category of authorized terminals, possible acceptable dispersions among the terminals of this category.

It is thus possible, based on two voltages measurements with two resistance values of the oscillating circuit of the transponder, to authenticate the terminal.

Further, the terminal may authenticate the transponder based on two current measurements in its oscillating circuit with these two resistance values.

These authentications may be exploited by the terminal, by the transponder, or by both.

Figure 5:
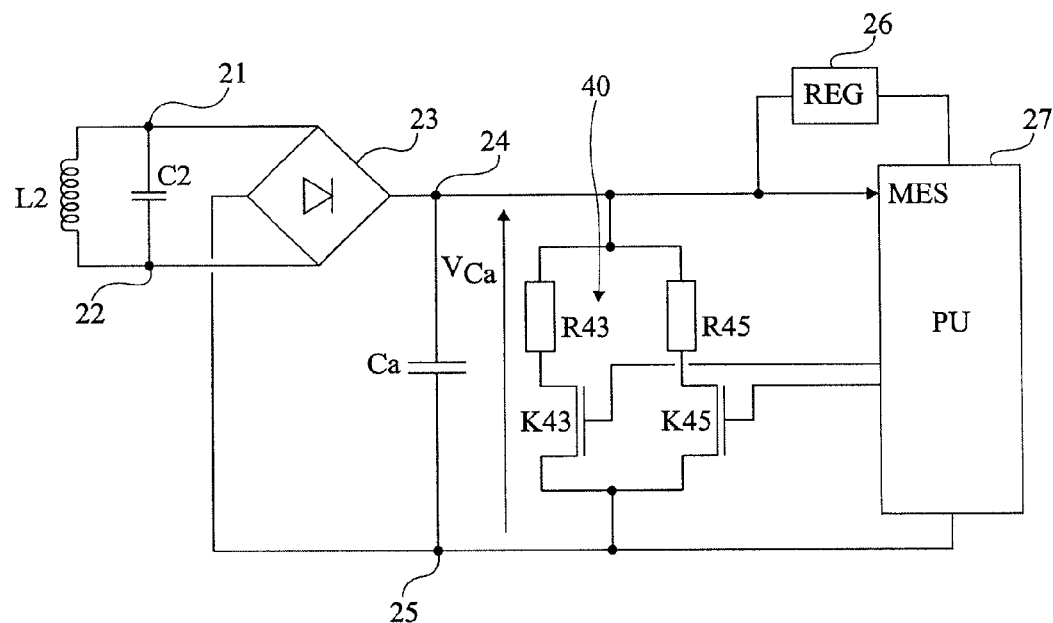
FIG. 5 is a block diagram of an embodiment of a transponder capable of authenticating a terminal.

FIG. 5 is a block diagram of an embodiment of a transponder 2, equipped to automatically determine, when it is in the field of a terminal (not shown), whether this terminal is authorized. The representation of FIG. 5 is simplified with respect to that of FIG. 2. In particular, the means of demodulation, retromodulation, and for obtaining the clock frequency have not been illustrated.

As previously, transponder 2 is based on a parallel oscillating circuit L2-C2 having its terminals 21 and 22 connected to the input terminals of a rectifying bridge 23. An element for measuring the current Ic intended for the processing unit may be provided at the output of regulator 26. Further, a switchable resistive circuit 40 is provided between terminals 24 and 25 of rectifying bridge 23. For example, two resistors R43 and R45 are connected in parallel, each being in series with a switch K43, respectively K45. Switches K43 and K45 (for example, MOS transistors) are intended to be switched to implement the method for determining the coupling position. Processing unit 27 (PU) receives information about voltage $V_{Ca}$ on an input MES to implement the above-described method. In the example of FIG. 5, when the two resistors R43 and R45 are functionally connected, resistor R2 (load of the transponder circuits) has value R20. The disconnection of one of the resistors (for example, resistor R43) increases resistance R2 towards value R21. Other connections and switchings may be provided according to the embodiment of the implemented method. For example, a single switchable resistor may be used, considering that one of the two values of resistor R2 corresponds to the resistive load of the other transponder circuits.

According to a preferred embodiment, the switchable resistor corresponds to that used for a resistive retromodulation. For example, a first measurement is performed by switching the retromodulation resistor so that it is functionally in the circuit (switch K30 in the on state in the example of FIG. 2). Voltage $V_{C2|R20}$ is measured. Then, switch K30 is turned off and voltage $V_{C2|R21}$ is measured.

As a variation, the increase or the decrease of equivalent resistance R2 is caused by a variation of the power consumption of the transponder circuits, typically of processing unit 27. For example, to decrease the value of resistor R2 (increase the power consumption), the execution of calculations or of processings by unit 27 is triggered. An increase of equivalent resistance R2 may also be caused by decreasing the consumption of unit 27 by interrupting certain calculations. As a variation, the execution speed conditioned by the clock is slowed down (block 20). The variation of resistance R2 is known from the time when the power consumption of different tasks to be executed by unit 27 is known.

The calculations required to authenticate a terminal are sufficiently simple for their execution time to be negligible with respect to the displacement speed of a transponder in front of a terminal (and thus the variation speed of the coupling coefficient). Such is in particular the case for transponders equipped with microcontrollers executing cryptography functions in which these calculation-intensive functions are themselves executed in a duration for which it can be considered that the coupling does not vary. In other cases, the transponder remains laid on a reception surface of the terminal and the coupling thus does not vary for an even longer period.

It should be noted that if a hacker attempts to intercept the exchanged values during the authentication, its simple presence in the field modifies the impedances seen by the terminal and/or the transponder and causes a failure of the authentication.

It should be noted that the authentication is performed by simple calculations and measurements.

Various embodiments with different variations have been described hereabove. It should be noted that those skilled in the art can combine various elements of these various embodiments and variations without showing any inventive step. In particular, the selection and the order of the tests to be performed depend on the application, for example, on the time available to perform the authentication, on the calculating capacity of the transponder, etc.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method of authentication, comprising:
   transmitting, to a transponder located in a magnetic field of a terminal, first data relative to a first level of a current in an oscillating circuit of the terminal, the first level of the current measured by the terminal for a first value of a resistive load of the transponder;
   receiving second data relative to a second level of the current in the oscillating circuit of the terminal, the second data evaluated by the transponder for a second value of the resistive load of the transponder;
   obtaining third data relative to the second level of the current in the oscillating circuit of the terminal, the second level of the current measured by the terminal for the second value of the resistive load of the transponder; and
   in response to receiving the second data and obtaining the third data, determining an authenticity of the transponder.

2. The method of claim 1, wherein the transponder evaluates said second data based on said first data and on fourth data relative to first and second levels of a D.C. voltage generated by an oscillating circuit of the transponder, the first and second levels of the D.C. voltage respectively measured for said first value of the resistive load and for a second resistive load value.

3. The method of claim 1, wherein:
the first data comprise a first ratio of an off-load level of the current in the oscillating circuit of the terminal to the first level of the current, the off-load level of the current corresponding to the current when no transponder is located in the magnetic field of the terminal; and
the third data comprise a second ratio of the off-load level of the current to the second level of the current.

4. The method of claim 1, wherein, in the absence of a determination that the transponder is authentic, the terminal sends incorrect data.

5. The method of claim 1, further comprising:
determining, by the transponder, an authenticity of the terminal,
wherein determining the authenticity of the terminal comprises exploiting said first data and fourth data.

6. The method of claim 5, wherein exploiting the first and fourth data comprises:
evaluating, based on said first and fourth data, a ratio between levels of the current in the oscillating circuit of the terminal; and
comparing the ratio with said first data.

7. The method of claim 5, wherein exploiting the first and fourth data comprises:
evaluating, based on said first and fourth data, a level of a D.C. voltage generated by an oscillating circuit of the transponder; and
comparing the evaluated level with a measured level of the D.C. voltage.

8. The method of claim 6, wherein, in the absence of a determination by the transponder that the terminal is authentic, said transponder sends incorrect data.

9. The method of claim 1, wherein determining the authenticity of the transponder comprises verifying that the transponder is authentic.

10. The method of claim 1, wherein determining the authenticity of the transponder comprises verifying that the transponder is inauthentic.

11. The method of claim 5, wherein determining the authenticity of the terminal comprises verifying that the terminal is authentic.

12. The method of claim 5, wherein the fourth data comprise a level of a D.C. voltage generated by an oscillating circuit of the transponder, the level of the D.C. voltage being measured by the transponder for the first value of the resistive load.

13. The method of claim 5, wherein determining the authenticity of the transponder comprises comparing the second and third data.

14. A terminal comprising:
an oscillating circuit configured to:
generate a magnetic field,
transmit data, via the magnetic field, to a transponder, and
receive data, via the magnetic field, from the transponder, the transponder being located in the magnetic field; and
a processor configured to:
use the oscillating circuit to transmit first data to the transponder, the first data corresponding to a first level of the current in the oscillating circuit, the first level of the current corresponding to a first value of a resistive load of the transponder,
use the oscillating circuit to receive second data, the second data corresponding to a second level of the current in the oscillating circuit, the second data being provided by the transponder, the second level of the current corresponding to a second value of the resistive load of the transponder,
obtain third data corresponding to the second level of the current in the oscillating circuit, the third data depending on a measurement of the second level of the current in the oscillating circuit, and
determine an authenticity of the transponder in response to receiving the second data and obtaining the third data.

15. A terminal device comprising:
an oscillating circuit configured to generate a magnetic field;
a regulating circuit configured to regulate a phase of a current of the oscillating circuit; and
a processor configured to determine an authenticity of a transponder in the magnetic field based, at least in part, on data received from the transponder, the received data corresponding to a level of the current in the oscillating circuit, the level of the current corresponding to a value of a resistive load of the transponder,
wherein the data received from the transponder is second data, wherein the level of the current in the oscillating circuit is a second level corresponding to a second value of the resistive load of the transponder, and wherein the processor is configured to cause the terminal to transmit, to the transponder, first data corresponding to a first level of the current in the oscillating circuit of the terminal, the first level of the current measured by the terminal for a first value of the resistive load of the transponder.

16. The terminal of claim 15, wherein
the oscillating circuit includes an antenna; and
the regulating circuit is configured to provide a constant phase relationship between the current of the oscillating circuit and a reference signal by regulating the phase of the current of the oscillating circuit.

17. The terminal of claim 15, wherein:
the oscillating circuit includes a capacitor and an antenna; and
the regulating circuit is configured to provide the oscillating circuit with an apparent impedance having no imaginary part, in static operation, by regulating the phase of the current of the oscillating circuit.

18. A terminal device comprising:
an oscillating circuit configured to generate a magnetic field;
a regulating circuit configured to regulate a phase of a current of the oscillating circuit; and
means for determining an authenticity of a transponder in the magnetic field based, at least in part, on data received from the transponder, the received data corresponding to a level of the current in the oscillating circuit, the level of the current corresponding to a value of a resistive load of the transponder,
wherein the data received from the transponder is second data, wherein the level of the current in the oscillating circuit is a second level corresponding to a second value of the resistive load of the transponder, and wherein the processor is configured to cause the terminal to transmit, to the transponder, first data corresponding to a first level of the current in the oscillating circuit of the terminal, the first level of the current measured by the terminal for a first value of the resistive load of the transponder.

19. A system comprising:

a transponder; and a terminal, the terminal including:
- an oscillating circuit configured to generate a magnetic field;
- a regulating circuit configured to regulate a phase of a current of the oscillating circuit, and
- a processor configured to determine an authenticity of the transponder in the magnetic field based, at least in part, on data received from the transponder, the received data corresponding to a level of the current in the oscillating circuit, the level of the current corresponding to a value of a resistive load of the transponder,
- wherein the data received from the transponder is second data, wherein the level of the current in the oscillating circuit is a second level corresponding to a second value of the resistive load of the transponder, and wherein the processor is configured to cause the terminal to transmit, to the transponder, first data corresponding to a first level of the current in the oscillating circuit of the terminal, the first level of the current measured by the terminal for a first value of the resistive load of the transponder.

20. The system of claim 19, wherein the transponder includes: an oscillator configured to provide a signal in response to the magnetic field, a rectifier configured to rectify a voltage of the signal provided by the oscillator, one or more circuits configured to form a resistive load on the oscillator, and a second processor configured to determine an authenticity of the terminal.

\* \* \* \* \*